Patented Jan. 18, 1938

2,105,672

UNITED STATES PATENT OFFICE 2,105,672

RUST PREVENTING COMPOSITION AND METHOD OF RUST PREVENTION

Robert Edward Sadtler, Selinsgrove, Pa.

No Drawing. Application June 30, 1937, Serial No. 151,322. In Canada June 28, 1937

2 Claims. (Cl. 148—6.5)

My invention relates to a rust-proofing composition and more particularly to a method of treating the surfaces of ferrous-base material, such as iron and steel articles to form compounds thereon which impart to the surfaces the property of effectively resisting the action of rust-promoting agents.

The principal object of my invention is to impart to the surfaces of articles of ferrous-base material the property of resisting the action of rust and corrosion promoting agents.

Another object of my invention is to provide an effective and economical process for rust-proofing the surfaces of iron and steel articles, which comprises applying a suitable compound to said surfaces, and then converting the iron component of said surfaces into compounds which yield non-ionizing salts of iron.

A further object of my invention is to provide a rust inhibiting composition which may be incorporated with a priming coat of paint or lacquer and applied to a surface of articles composed of ferrous-base materials.

It has heretofore been the practice, to impart rust-resisting properties to the surfaces of iron or steel articles by forming coatings of substantially water-insoluble compounds thereon, or of water-impervious films such as those formed chiefly of oils, waxes, pitches, or resinoid compositions; or of contacting layers of finely-divided metals such as zinc dust or metallic salts of such electro-chemical properties as to retard or inhibit electrolysis which produces corrosion.

In practical application in service, the above-mentioned coatings fail through exposure of the base or foundation metal due to removal of the coating compound by mechanical abrasion or to capillary penetration of moisture by absorption. Consequently, some method of producing a coating on metallic surfaces which will be unaffected by the previously mentioned factors is highly desirable.

I have made the discovery that the formation of rust on ferrous-base metallic surfaces may be substantially retarded or inhibited by applying a nitrogen containing compound to such surfaces and reacting the compound with the iron component of said surfaces, thereby forming non-ionizable iron compounds thereon in which the iron ion is incapable of acting as a free ion.

My researches upon this subject also indicate that aqueous solutions of nitrogenous compounds, such as substituted ammonia or metal ammino compounds are highly effective in inhibiting the action of rust-promoting agents when such solutions are applied to ferrous-base metallic surfaces.

In practicing my invention, I prepare a solution of the rust-proofing composition by dissolving in an aqueous medium or in an organic solvent, from .87 to 17.5 grams per liter of solvent, of a suitable nitrogen-containing compound, such as formamide, ammonium sulfocyanate, potassium ferrocyanide, potassium ferricyanide, potassium cyanate, sodium cyanide, acetonitrile, urea, ammonium ferrocyanide, or ammonium ferricyanide, or a mixture thereof. I prefer, however, to employ ammonium or other volatile-base compounds of the above-mentioned reagents as it is thus feasible to eliminate such volatile bases by a heating or baking operation after, or during, the reaction resulting in the formation of the non-ionizing compounds of iron. This procedure is especially advantageous in that only the non-ionizing iron compound of the reaction mass remains on the surfaces of the article treated; the volatile base being eliminated after it has performed its function. Also, the elimination of $NH_3$ by volatilization in certain of the previously mentioned compounds, is accompanied by the absorption of the acid residue into the complex ion, thus promoting the yield of non-ionizing iron salts.

The aqueous solution containing a nitrogen compound, prepared as described above, may be applied to the surfaces of iron or steel articles by any suitable method, such as by brushing, spraying, or immersing the article to be protected in the solution. After drying in air, the coated article may be placed in a suitable oven and baked at an elevated temperature, say about 200° F. for about 30 minutes to dehydrate the coating composition and eliminate volatile constituents thereof. If desired, a suitable priming paint or lacquer may then be applied to the treated metallic surface.

If it is desired to utilize an organic solution of my improved rust-proofing composition, it should be admixed with the priming coat of paint or lacquer which is to be applied to the metallic surface. For this purpose, the nitrogen-containing compound is dissolved in a suitable organic solvent, such as denatured ethyl, or methyl alcohol, which in turn is rendered miscible and compatible with the paint or lacquer by blending with a larger volume of gasoline or naphtha, employing a suitable blending agent, such as butyl, isobutyl, propyl, or isopropyl alcohol.

The following specific example will serve to illustrate and explain my invention. 7 grams of ammonium sulfocyanate were dissolved in 75 cubic centimeters of methanol, and 200 cubic centimeters of gasoline were added to this solution and thoroughly mixed therewith while utilizing about 125 cubic centimeters of butyl alcohol as a blending agent. This solution was then mixed with a suitable priming paint in the proportion of about 3% to 7% by volume, but preferably in the proportion of 5% by volume. After this mixture had been applied to iron or steel articles by any appropriate method they were gradually heated in an oven or kiln to a temperature of about 200° F. for about 30 minutes to eliminate ammonia and volatile solvents. Thus prepared, the metallic surfaces could subsequently be subjected to any desired finishing operation.

My improved composition and process for producing non-ionizing iron salts on the surfaces of iron and steel articles furnishes a very high degree of resistance to rusting and corrosion under conditions of practical use. Furthermore, my improved composition may be satisfactorily incorporated in paints or lacquers which are subsequently utilized as the priming coats on iron and steel articles.

While I have described my invention in considerable detail and have given specific examples, it will be understood that such examples shall be construed as illustrative and not by way of limitation. Other modifications of my invention will be apparent to those skilled in the art without departing from the spirit and scope thereof. It is, therefore, desired that only such limitations shall be imposed as are indicated in the appended claims.

I claim as my invention:

1. A rust preventing composition for forming non-ionizing iron salts upon application to iron or steel articles, comprising about 27 grams of ammonium sulfocyanate, about 75 cubic centimeters of methanol, approximately 200 cubic centimeters of gasoline and about 125 cubic centimeters of butyl alcohol.

2. The method of rust-proofing ferrous-base material which comprises applying thereto a solution containing about 27 grams of ammonium sulfocyanate, about 75 cubic centimeters of methanol, approximately 200 cubic centimeters of gasoline and about 125 cubic centimeters of butyl alcohol and then heating said material for about 30 minutes to a temperature of approximately 200° F. to eliminate volatile constituents and to form a reaction compound upon said material whereby said material is permanently rust-proofed.

ROBERT EDWARD SADTLER.